US007113555B2

(12) United States Patent
Campello de Souza et al.

(10) Patent No.: US 7,113,555 B2
(45) Date of Patent: Sep. 26, 2006

(54) DATA CHANNEL WITH JOINT DATA ESTIMATION AND TIMING RECOVERY

(75) Inventors: Jorge Campello de Souza, Sunnyvale, CA (US); Brian H. Marcus, Vancouver (CA); Richard M. H. New, San Jose, CA (US); Bruce A. Wilson, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 719 days.

(21) Appl. No.: 10/272,372

(22) Filed: Oct. 15, 2002

(65) Prior Publication Data

US 2004/0071232 A1    Apr. 15, 2004

(51) Int. Cl.
*H03D 1/00*    (2006.01)
*H03D 1/04*    (2006.01)
(52) U.S. Cl. .................. 375/341; 375/343; 375/346
(58) Field of Classification Search .......... 375/341–346
See application file for complete search history.

(56) References Cited

U.S. PATENT DOCUMENTS

| 5,966,257 A | 10/1999 | Behrens et al. |
| 5,974,091 A | 10/1999 | Huff |
| 5,991,914 A | 11/1999 | Honma |

OTHER PUBLICATIONS

L. R. Bahl et al., "Optimal Decoding of Linear Codes for Minimizing Symbol Error Rate", IEEE Transactions on Information Theory, Mar. 1974, pp. 284 287.
J. Hagenauer et al., "A Viterbi Algorithm with Soft-Decision Outputs and its Applications", Proc. of GLOBECOM '89, Dallas, TX, USA, Nov. 1989, pp. 47.1.1-47.1.7.

O. Macchi et al., "A Dynamic Programming Algorithm for Phase Estimation and Date Decoding on Random Phase Channels", IEEE Transactions on Information Theory, vol. IT-27, No. 5, Sep. 1981, pp. 581-595.
L. I. Scharf et al., "Modulo-2Pi Phase Sequence Estimation", IEEE Transactions on Information Theory, vol. IT-26, No. 5, Sep. 1980, pp. 615-620.
G. Ungerboeck, "New Application For The Viterbi Algorithm: Carrier-Phase Tracking in Synchronous Data-Transmission Systems", Proc. Nat. Telecommun. Conf., 1974, pp. 734-738.

*Primary Examiner*—Khai Tran
*Assistant Examiner*—Cicely Ware
(74) *Attorney, Agent, or Firm*—Thomas R. Berthold; Daniel E. Johnson

(57) ABSTRACT

A data channel includes a data detector that approximates both inter-symbol-interference (ISI) and random timing perturbations using a single finite-state hidden Markov model. The ISI is approximated by a finite impulse response and the timing perturbations are approximated by a first order random walk. The data signal, which is subject to inter-symbol interference and timing perturbations, is sampled periodically over a succession of time epochs without regard to timing perturbations. Timing perturbation values and data states are then assigned for each epoch, and each timing perturbation value is paired with each data state to arrive at a set of composite states. Probabilities are then assigned between composite states in successive epochs to arrive at the most probable composite state sequence corresponding to the sequence of detected data values from the sampled data. A Viterbi algorithm is then applied to find the maximum likelihood sequence of composite states. The resulting composite state sequence then defines both the data sequence and timing trajectory which, jointly, are most likely given the observations.

13 Claims, 15 Drawing Sheets

DATA CHANNEL WITH JOINT DATA ESTIMATION AND TIMING RECOVERY

TECHNICAL FIELD

This invention relates in general to data channels, such as those used in communication systems and data storage systems, and more particularly to data channels that use Viterbi maximum-likelihood estimation of the data sequence in the presence of timing perturbations in the sampled data.

BACKGROUND OF THE INVENTION

In high speed communication systems and high density data storage systems, intersymbol interference (ISI) makes direct peak detection of the data pulses impractical. As a result Viterbi detectors are often used to provide a maximum likelihood estimate of the original data sequence, based on possible states of ISI. Viterbi detectors are commonly used in data storage systems, such as magnetic recording hard disk drives.

In addition to ISI, timing irregularities are present to a greater or lesser degree in most communications systems and all data storage systems. In particular, because most data storage systems involve a moving recording medium, usually a rotating optical or magnetic disk, random fluctuations in the motion of the recording medium during the read and write processes cause timing perturbations or distortions of the readback signal. In a magnetic recording hard disk drive the read-back signal is typically filtered, sampled, digitized and equalized and the resulting equalized samples are passed to a Viterbi detector. The detector relies upon a well defined, time-invariant relationship between the recorded data and the read-back signal to enable detection. To ensure that the relationship between recorded data and the read-back signal does not vary, the frequency and phase of the sample clock must be continually adjusted to compensate for the slowly changing timing distortions caused by the system. The process of adjusting the sample clock is often referred to as timing recovery.

Timing recovery is usually treated as a secondary feedback function separate from the Viterbi detector. The phase and frequency of the sample clock are set at the beginning of each data block using a fixed preamble pattern. The timing recovery system estimates the timing error on each received symbol and applies feedback to the sample clock to correct the frequency and phase. The feedback nature of the timing loop limits the performance of the timing recovery process.

What is needed is a data channel that uses a Viterbi detector but without the need for a timing recovery feedback loop. Such a data channel would be more reliable, since instabilities inherent in a timing recovery feedback loop would be eliminated. Such a data channel would also be more efficient since a preamble pattern would not be required.

SUMMARY OF THE INVENTION

The invention is a data channel with a data detector that approximates both inter-symbol-interference (ISI) and random timing perturbations using a single finite-state hidden Markov model. The ISI is approximated by a finite impulse response and the timing perturbations are approximated by a first order random walk. The data signal, which is subject to inter-symbol interference and timing perturbations, is sampled periodically over a succession of time epochs without regard to timing perturbations. Timing perturbation values and data states are then assigned for each epoch, and each timing perturbation value is paired with each data state to arrive at a set of composite states. Probabilities are then assigned between composite states in successive epochs to arrive at the most probable composite state sequence corresponding to the sequence of detected data values from the sampled data. In the preferred embodiment a Viterbi algorithm is then applied to find the maximum likelihood sequence of composite states. The resulting composite state sequence then defines both the data sequence and timing trajectory which, jointly, are most likely given the observations. This approach provides a means of detecting data with rapidly fluctuating timing perturbations at low signal to noise ratio. This is particularly relevant to disk drive data storage applications where mechanical perturbations, such as variations in disk rotational speed, are translated into timing perturbations. As an alternative to a Viterbi algorithm the probabilities can be assigned by determining the a posteriori probabilities by applying the Bahl-Cocke-Jelinek-Raviv (BCJR) algorithm or a soft-output Viterbi (SOVA) algorithm.

One aspect of the invention is a method for detecting data in a data channel, in which the data signal is subject to inter-symbol interference and timing perturbations and is sampled periodically over a succession of time epochs without regard to the perturbations. The method includes assigning integer timing perturbation values from −m to +m for each epoch; assigning $A^n$ data states for each epoch, corresponding to n previous data samples each having A possible values; and pairing each timing perturbation value with each data state to arrive at $(2m+1)*(A^n)$ composite states, for each epoch. The method further includes assigning probabilities to the transitions between composite states in successive epochs, the probabilities depending upon samples of the data signal; whereby the most probable data values are determined, the data values corresponding to the sequence of detected data values from the sampled data.

Another aspect of the invention is a method for detecting digital data in a disk drive data channel having a read head providing an analog signal, a sampling clock controlling the sampling of the analog signal at successive time epochs in the presence of timing perturbations, and an analog-to-digital converter (ADC) converting the sampled analog signal to digital data samples, in which the digital data samples are subject to inter-symbol interference. The method includes assigning integer timing perturbation values from −m to +m for each epoch while constraining the assigned timing perturbation value to increment or decrement by no more than 1 from the timing perturbation value assigned at the preceding epoch; assigning $2^n$ data states for each epoch, corresponding to n previous digital data samples each having a possible value of 0 or 1; and pairing each timing perturbation value with each data state to arrive at $(2m+1)*(A^n)$ composite states, for each epoch. The method further includes applying a Viterbi algorithm to the composite states in successive epochs to jointly determine the maximum likelihood path of timing perturbation values and the maximum likelihood digital data sequence.

For a fuller understanding of the nature and advantages of the present invention, reference should be made to the following detailed description taken together with the accompanying figures.

DETAILED DESCRIPTION OF THE INVENTION

Prior Art

Figure 1:
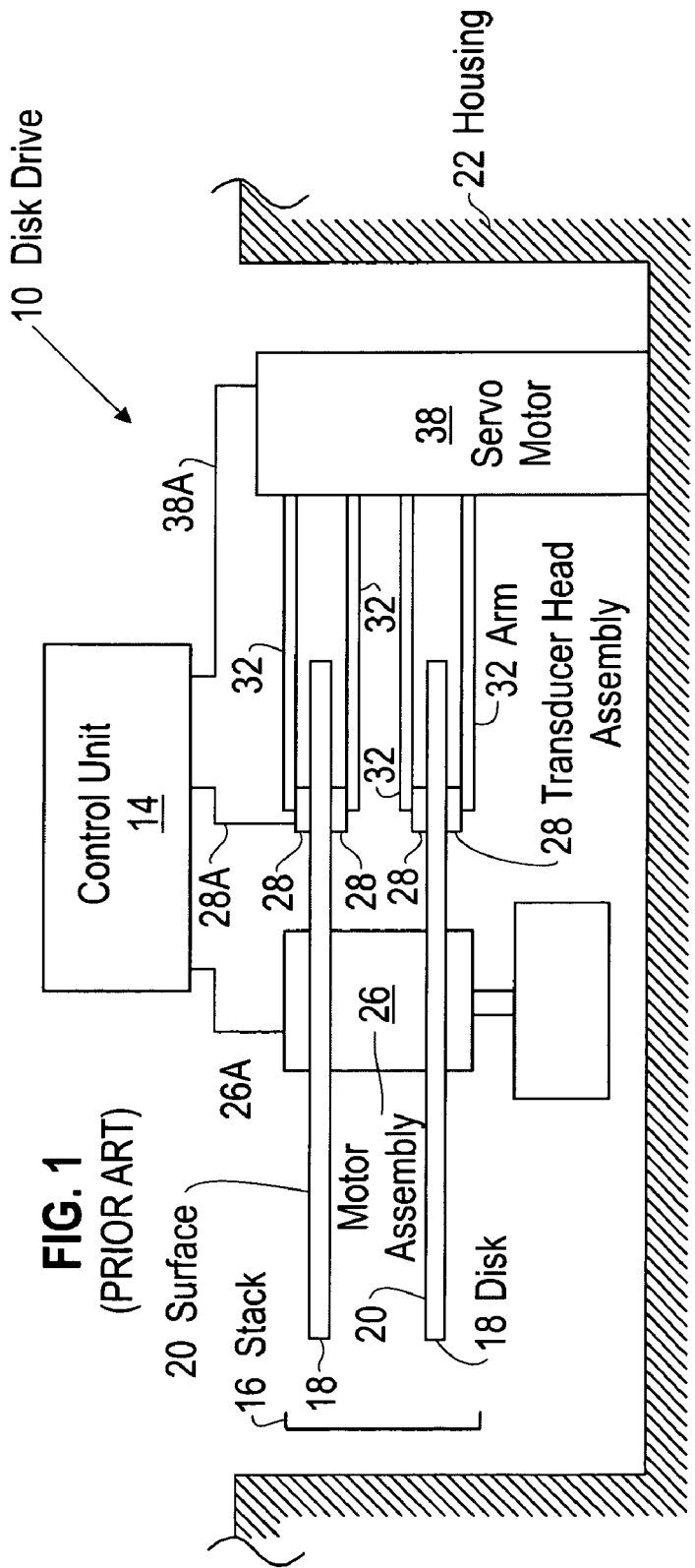
FIGS. 1 and 2 are schematic diagrams, in side and sectional view, respectively, of a prior art disk drive.
Figure 2:
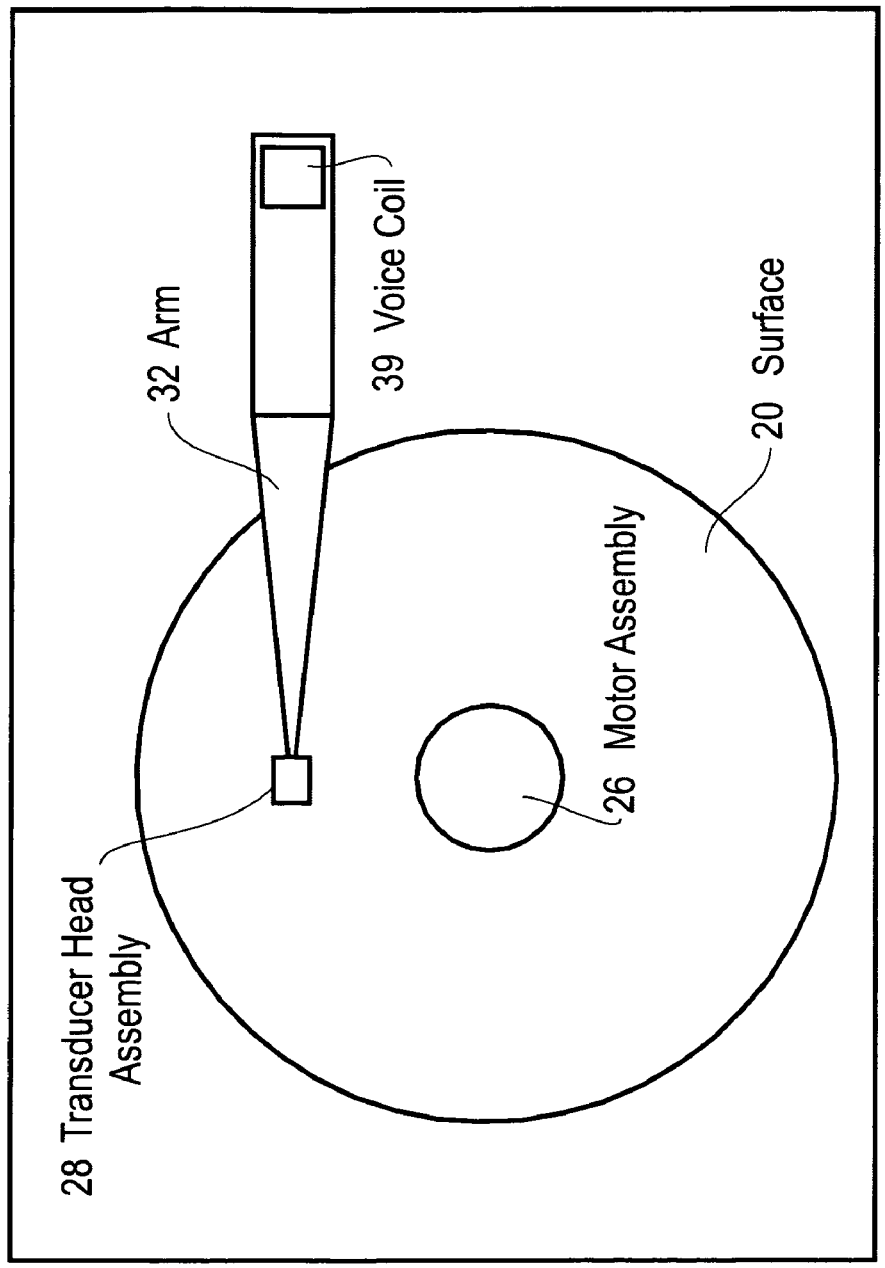

Referring now to the drawings, in FIGS. 1 and 2 there is illustrated a data storage hard disk drive, generally designated as 10. The disk drive 10 includes a control unit 14, a stack 16 of disks 18 each having at least one magnetic recording surface 20. The disks 18 are mounted parallel to one another within a housing 22 for simultaneous rotation by an integrated spindle and motor assembly 26. Information on each magnetic disk surface 20 is read from or written to the disk surface 20 by a corresponding transducer head assembly 28 movable in a path having a radial component across the rotating disk surface 20. Each transducer head assembly 28 includes a write head and a read head.

Each transducer head assembly 28 is carried by an arm 32. The arms 32 are ganged together for simultaneous pivotal movement by a head drive servo motor 38 including a voice coil 39 cooperating with an internal magnet and core assembly. Drive signals applied to the voice coil 39 cause the arms 32 to move in unison to position the transducer head assemblies 28 in registration with information storage tracks on the disk surfaces 20 where information is written or read.

The disk drive 10 is controlled by signals provided by the control unit 14, including motor control signals on line 26A and head position control signals on line 38A. In a typical arrangement, control unit 14 provides an interface with a computer that provides data read and write commands, and data signals are transmitted to or from the transducer head assemblies over corresponding lines 28A, one of which is seen in FIG. 1. Servo position information is recorded on the disk surfaces 20, and the read heads of the transducer, head assemblies 28 read this servo information to provide a servo position signal to the control unit 14. This information is employed by the control unit 14 to provide position control signals on line 38A. The purpose of this servo position feedback system is to assure accurate and continuous positioning of the transducer head assemblies 28 so that data is written to and read from precise locations on the disk surfaces 20.

Figure 3:
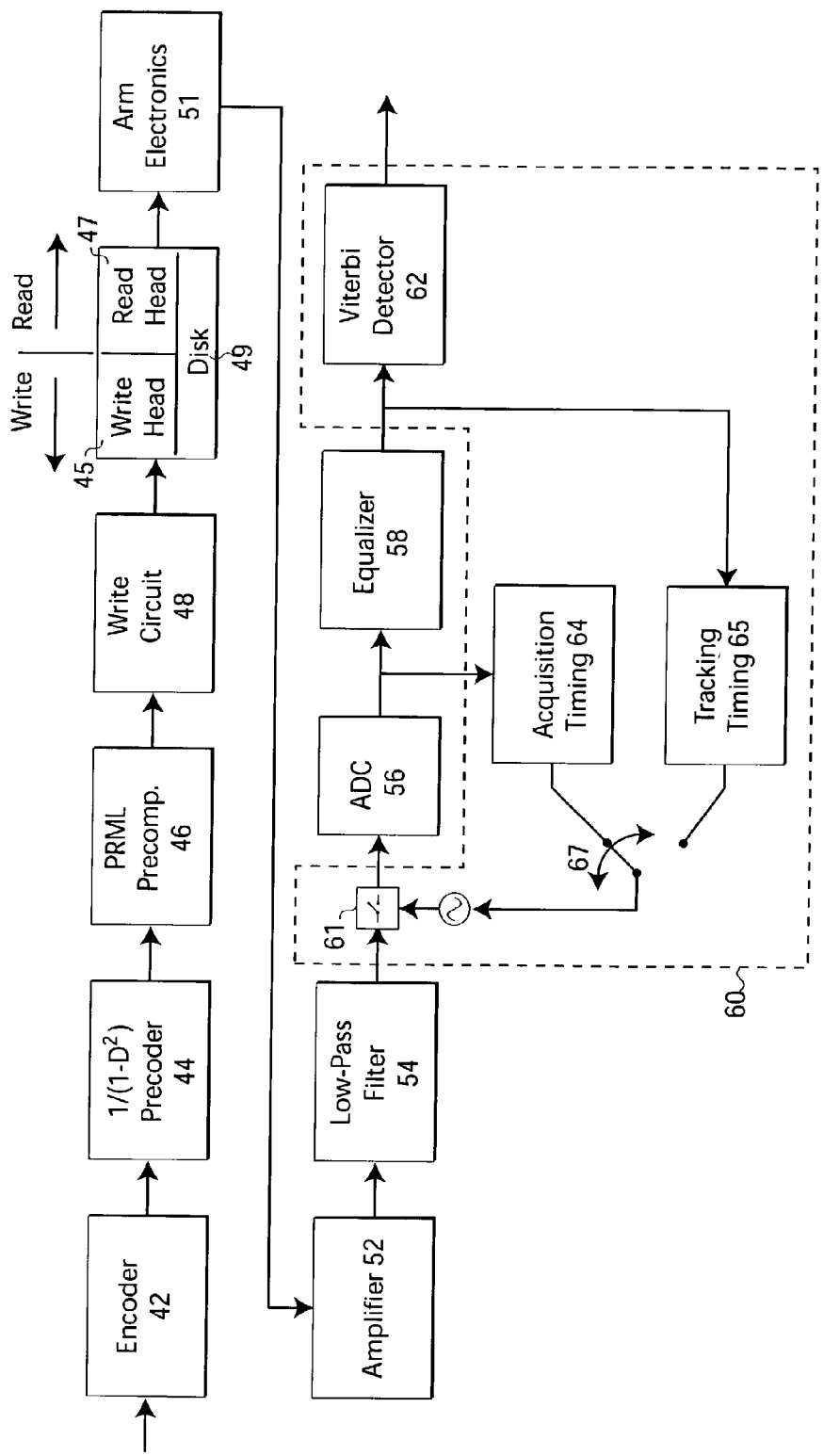
FIG. 3 is a block diagram of a prior art partial-response maximum-likelihood (PRML) data channel in a disk drive.

Referring now to FIG. 3, there is shown a block diagram of a partial-response maximum-likelihood (PRML) data channel available in the disk drive 10. Data to be written is applied to an encoder 42 for providing a modulation coded output having predefined run length constraints. A precoder 44 follows the encoder 42 described by a well-known $1/(1-D^2)$ operation where D is a unit delay operator. A PRML precompensation circuit 46 coupled to the precoder 44 provides a modulated binary pulse signal applied to a write circuit 48 that provides the modulated write current to the write head 45 for writing to the disk 49. An analog read signal is obtained at the read head 47. The analog read signal is applied to a variable gain amplifier (VGA) 52 and the amplified read signal is applied to a low pass filter 54. The filtered read signal is sampled at device 61 and the sampled analog signal sent to analog-to-digital converter (ADC) 56, which supplies digital samples to an equalizer 58. The output from equalizer 58 is then sent to a conventional Viterbi detector that determines the maximum-likelihood digital data values for the read-back data. A separate timing recovery system 60 includes an acquisition timing block 64 that operates on the preamble at the beginning of each data block (typically 512 bytes in a conventional disk drive) and a tracking block 65 that operates on the data. The output from timing blocks 64, 65 are sent through switch 67 to adjust the frequency and phase of the sample clock 66 to control the sampling of the data.

Figure 4:
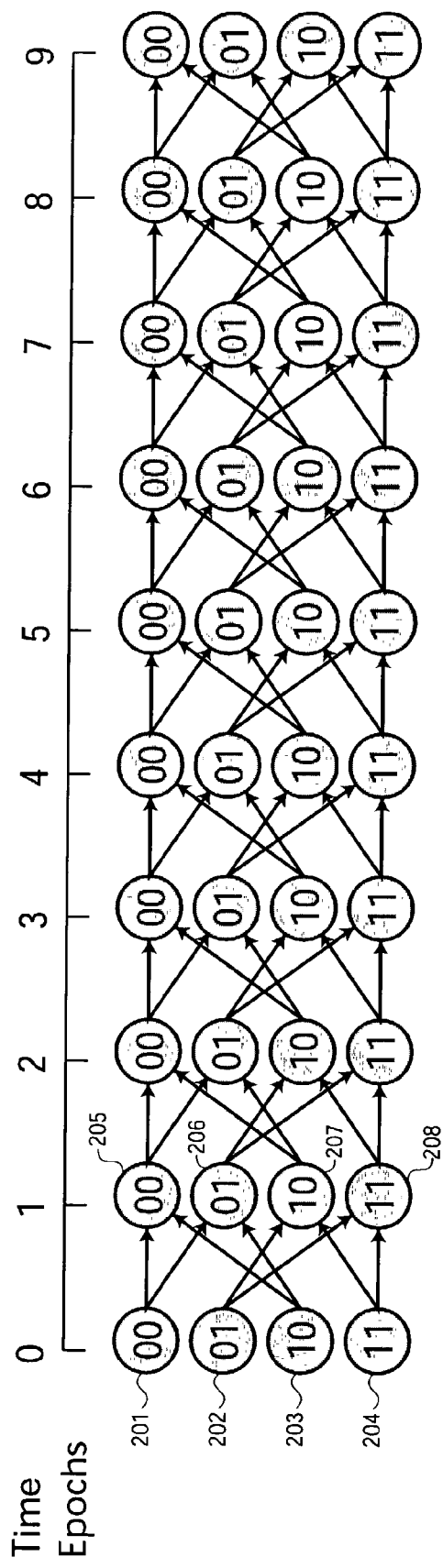
FIG. 4 is a trellis diagram representation of a prior art class-IV partial response (PR4) channel using a Viterbi algorithm.

The Viterbi detector 62 relies upon a well defined relationship between the recorded data and the read-back signal to enable detection. The relationship between the recorded data and the read-back signal is specified by a hidden Markov model which can be described using a trellis diagram, as shown by FIG. 4. A Markov process of order n is a discrete random process in which the statistics of a given sample of the process are completely specified by the n preceding samples. If the order n is not specified it is assumed to be 1. A hidden Markov process is a secondary random process in which the statistics of a sample of the process are completely specified by the corresponding value of a Markov random process. The term hidden Markov model indicates that the true process is modeled using a hidden Markov process. Let $s=\{s_0, s_1, \ldots\}$ denote a first order Markov process. The probability distribution function of a sample $s_i$ is completely specified by the previous sample $s_{i-1}$, thus $$p(s_i|s_{i-1}, s_{i-2}, \ldots, s_0) = p(s_i|s_{i-1}).$$

Now let y denote a hidden Markov process such that the probability distribution function of a sample $y_i$ is completely specified by $s_i$, thus $$p(y_i|s_i, s_{i-1}, \ldots, s_0, y_{i-1}, y_{i-2}, \ldots, y_0) = p(y_i|s_i).$$

FIG. 4 is a trellis diagram representation of a class-IV partial response (PR4) channel using a Viterbi algorithm based on this hidden Markov process. Each data state corresponds to a unique value of the previous two recorded data bits for a time epoch, such as states 201–204 for time epoch 1 and states 205–208 for time epoch 2. The double line indicates the maximum-likelihood path determined by the Viterbi algorithm.

DETAILED DESCRIPTION OF THE PREFERRED EMBODIMENTS

The present invention is a data channel with a replacement for the prior art Viterbi detector 62 and timing recovery system 60 of FIG. 3. Before explaining the detailed operation of the specific components of the data channel of the present invention, the method for jointly estimating the data sequence and the timing perturbations will be explained using well-known mathematical models.

The design and manufacture of a Viterbi detection system is taught in detail in the prior art. A complete description of a hidden Markov model will be understood by those skilled in the art to completely specify a Viterbi detector for the recording system described by that model. In the prior art the model used to describe the relationship between the data and the read-back signal assumes ideal synchronization between the recorded data pattern and the sample clock. The following section will describe how to construct a single hidden Markov model which jointly describes the relationship between the read-back signal, the recorded data and the timing perturbations.

Consider a recording system with linear ISI, noise and timing perturbations. A sequence of binary symbols $x_k \in \{-1, +1\}$ passes through a linear channel with impulse response $h(t)$. Symbols are recorded with a nominal bit period T. The resulting filtered signal $$s(t) = \sum_k x_k h(t - kT)$$

is corrupted by noise to give $$r(t) = n(t) + \sum_k x_k h(t - kT)$$

The noisy read-back signal is perturbed by a timing disturbance $\theta(t)$ to produce a distorted read-back signal $d(t)$ such that $$d(t - \theta(t)) = r(t)$$
$$= n(t) + \sum_k x_k h(t - kT)$$

Assume that $\theta(t)$ is known at the receiver and $d(t)$ is synchronously re-sampled to yield the discrete-time sequence $$z_k = d(kT - \theta_k)$$
$$= n_k + \sum_j x_j h_{j-k}(t - kT)$$

where $\theta_k = \theta(kT)$, $h_k = h(kT)$ and $n_k = n(kT)$. The noise sequence $n_k$ is independently identically distributed (iid) Gaussian with variance $\sigma_n$ and $h_k$ has constraint length v, i.e., $h_k = 0$ for all $k < 0, k > v$.

This model is representative of many detectors in which the sample clock is varied to track timing disturbances to yield a time invariant discrete-time channel.

Boldface will be used to denote a sequence of random variables. For instance x denotes the entire sequence of recorded data bits and d denotes the entire distorted readback signal, etc. Superscripts and subscripts denote a range of value, for example $x_j^k$ denotes $\{x_j, x_{j+1}, \ldots, x_k\}$. Computing a conditional likelihood for $z_k$ is a key component of the maximum-likelihood detector which will be described later. The definition of $z_k$, above, together with the assertion that $n_k$ is iid Gaussian leads directly to $$p(z_k | x_{k-v}^k) = \frac{1}{\sigma_n \sqrt{2\pi}} e^{-\frac{|z_k - \sum_{j=k-v}^k x_j h_{k-j}|^2}{2\sigma_n^2}}$$

In order to compute $z_k$ from d $\theta_k$ must be provided, and thus $$p(z_k | x_{k-v}^k; \theta_k) = \frac{1}{\sigma_n \sqrt{2\pi}} e^{-\frac{|d(kT - \theta_k) - \sum_{j=k-v}^k x_j h_{k-j}|^2}{2\sigma_n^2}}$$

Figure 5:
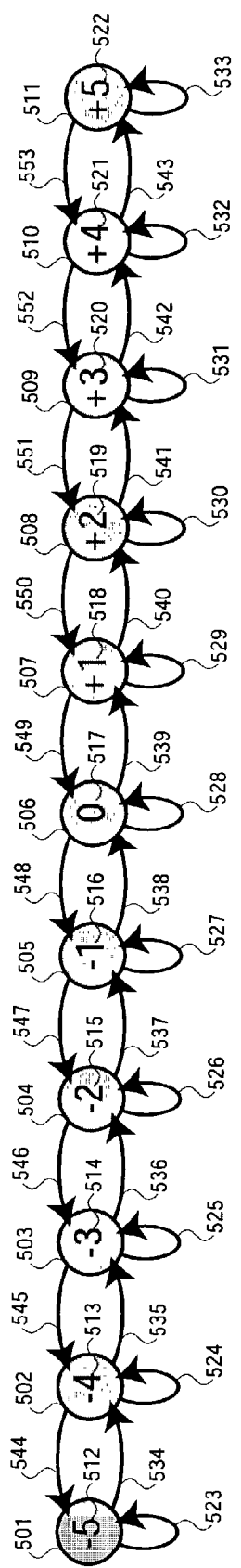
FIG. 5 is a state diagram representation of a Markov model for timing perturbations showing 11 possible timing states at a single time epoch and their possible timing states in a successive time epoch.

The timing perturbations $\theta_k$ are assumed to follow a discrete first order random walk. That is, $$\theta_k = \sum_{j=0}^k \delta_j,$$

where the timing noise process $\delta_k$ is an iid discrete random process taking values $\ldots -2\epsilon, -\epsilon 0, \epsilon, 2\epsilon \ldots$. The number of states in the Markov model for timing is equal to the number of integer values which $\theta_k$ can take, thus to simplify the model both $\theta_k$ and $\delta_k$ are restricted to some finite range of values. FIG. 5 shows a state diagram for a random walk where $\delta_k$ takes only the values $\{-1, 0, +1\}$ with probability $\{p_-, p_0, p_+\}$ respect $\theta_k$ lies in the range $-5\epsilon > \theta_k > 5\epsilon$. The parameters of this Markov model are the transition probabilities $\Pr\{\theta_k | \theta_{k-1}\}$ and are assumed to be known for a given recording system.

With the definitions given above, it is now possible to explain the combination of the model given above for a channel with ISI and known timing fluctuations together with the model for random walk timing perturbations. The combined Markov model incorporates ISI and timing perturbations. The states of this combined model at time k are associated with a specific value for the v−1 data bits $x_{k-v+1}^k$ and a specific value for the timing perturbation $\theta_k$ such that a single state is associated with each allowed combination of values for $x_{k-v+1}^k$ and $\theta_k$. Trellis branches represent allowed transitions from one state to another and each branch is associated with specific values for $x_{k-v}^k$ and $\theta_{k-1}^k$.

The sequences x and $\theta$ which jointly maximize the likelihood function $p(z; \theta | x)$ are decoded. The sequences which maximize this likelihood can be found recursively using the Viterbi algorithm and the branch likelihood function $$p(z_k; \theta_k | \theta_{k-1}; x_{k-v}^k) = p(z_k | \theta_k; x_{k-v}^k) \Pr\{\theta_k | \theta_{k-1}\}$$

where $$p(z_k | x_{k-v}^k; \theta_k) = \frac{1}{\sigma_n \sqrt{2\pi}} e^{-\frac{|d(kT-\theta_k) - \sum_{j=k-v}^{k} x_j h_{k-j}|^2}{2\sigma_n^2}}$$

as derived above and $\Pr\{\theta_k|\theta_{k-1}\}$ is a parameter of the random walk model for timing. Note that the read-back signal appears in the branch likelihood computation as d (kT−$\theta_k$), where the timing perturbation term $\theta_k$ varies form branch to branch.

FIG. 5 shows a state diagram representation of a random walk Markov model for the timing perturbations. This Markov model has a set of discrete timing states (501–511), each state corresponding to a unique integer value of the timing perturbations (512–522). Edges (523–553) are used to indicate possible ways in which the timing perturbation value may change from time epoch to the next, under the constraint that the timing perturbation value can not increment or decrement by more than one from one epoch to the next. For example, looking at the value +2 (state 508), it is apparent that the next value can only be +2, +3 or +1. In the present invention integer timing perturbation values from −m to +m are assigned. In the example of FIG. 5, there are 10 integer timing perturbation values from −5 to +5 (m=5). Edges 523–533 correspond to the timing perturbation remaining the same from one bit time to the next. Edges 534–543 correspond to the timing perturbation increasing from one quantization step from one bit time to the next. Edges 544–553 correspond to the timing perturbation decreasing from one bit time to the next. Each edge is associated with a probably (not shown) and the sum of probabilities for all edges emanating from a single state is, by definition, always one. Any typical sequence of timing perturbations corresponds to a sequence of states such that two successive states are joined by an edge in the state diagram. The probability of this sequence is the product of the probabilities associated with each edge traversed passing from state to state.

Figure 6:
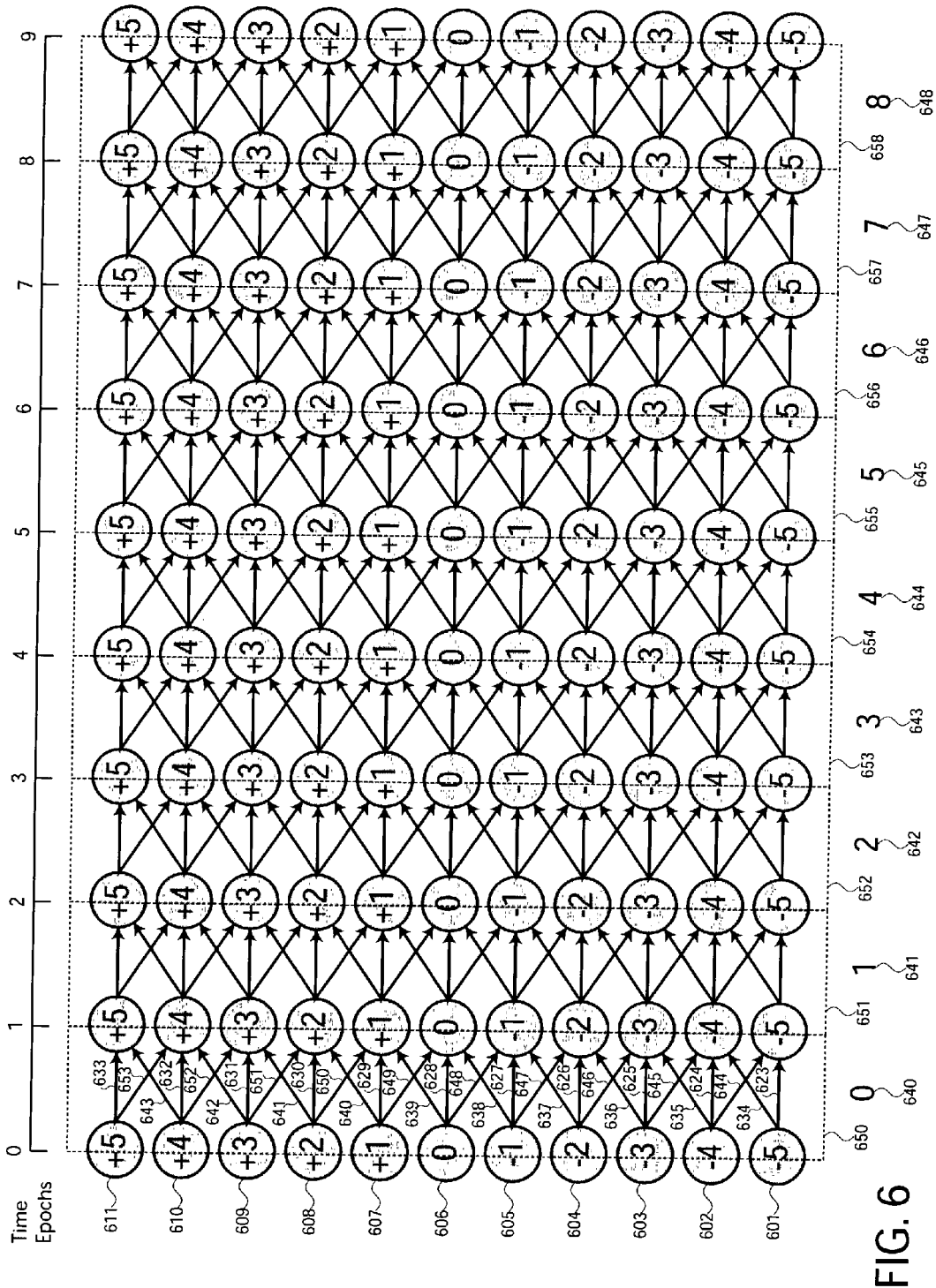
FIG. 6 is a trellis diagram representation of the same Markov model represented in FIG. 5.

FIG. 6 shows a trellis diagram representation of the same Markov model represented in FIG. 5. In the trellis diagram representation, a set of timing states or perturbations values is drawn for each time epoch. This trellis diagram consists of 9 trellis sections 650–658 corresponding to epochs 0 through 8. Each trellis section is comprised of the states of the Markov model at the beginning of the bit time (the time duration between successive epochs), the states of the Markov model at the end of the bit time and the edges connecting these states. Thus items 601–611 correspond to states 501–511 in at the beginning of the sequence, immediately before bit 0. Items 623–653 correspond to edges 523–553. As in FIG. 5 any typical sequence of timing perturbations corresponds to a sequence of states such that two successive states are joined by an edge in the state diagram. In the trellis representation such a sequence corresponds to a path through the trellis. A trellis diagram representing the entire data frame would require as many trellis sections as data bits in the frame.

Figure 7:
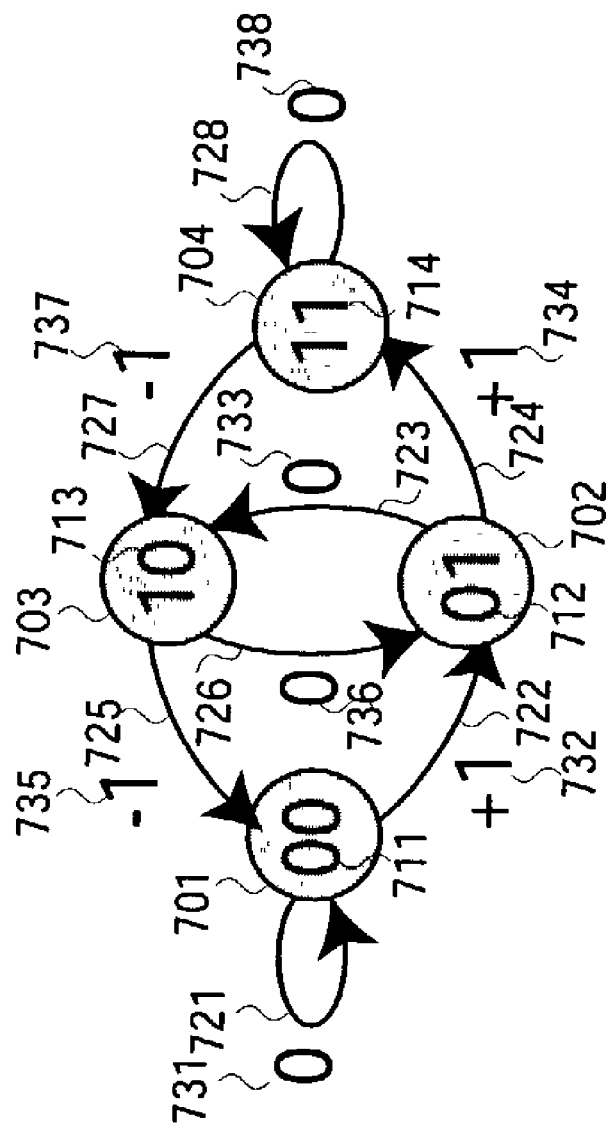
FIG. 7 is a state diagram representation of a class-IV partial response (PR4) channel showing four possible data states for a single time epoch and their possible data states in a successive time epoch.

FIG. 7 shows a state diagram representation of a class-IV partial response (PR4) channel showing four possible data states for each time epoch. Each state (701–704) corresponds to a unique value of the previous two recorded NRZ data bits (711–714). Edges (721–728) are used to indicate possible ways the system can evolve during each bit time. Edges 721, 723, 725 and 727 correspond to a recorded NRZ 0. Edges 722, 724, 726 and 728 correspond to a recorded NRZ 1. Each edge is associated with an ideal, noise-free, read-back signal (731–738). Any possible sequence of noise-free read-back signals corresponds to a sequence of edges traversing from state to state on the state diagram. FIG. 7 represents a special case of the more general case where there are $A^n$ data states for each epoch, corresponding to n previous data samples where each data sample has A possible values. In FIG. 7, n=2 and A=2. In a data channel with digital data samples, each sample being a 0 or 1 (i.e., A=2), such as a disk drive data channel, the most common implementations of the Viterbi detector operate on either the previous 2 (n=2) or previous 4 (n4) samples.

Figure 8:
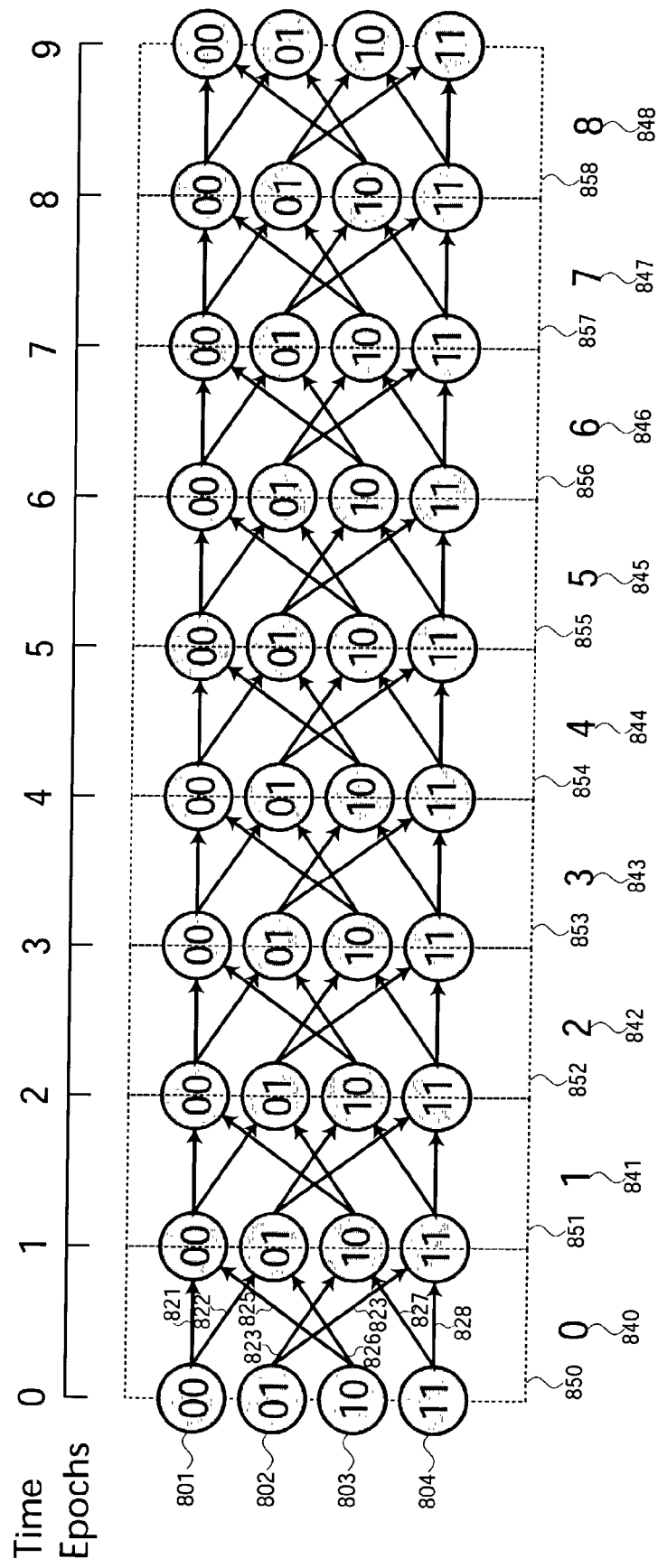
FIG. 8 shows a trellis diagram representation of the same model represented in FIG. 7.

FIG. 8 shows a trellis diagram representation of the same model represented in FIG. 7. In the trellis diagram representation, a set of data states is drawn for each time epoch. This trellis diagram consists of 9 trellis sections 850–858 corresponding to epochs 0 through 8. Each trellis section is comprised of the states of the model at the beginning of the bit time, the states of the model at the end of the bit time and the edges connecting these states. Thus items 801–804 correspond to data states 701–704 in at the beginning of the sequence, immediately before bit 0 (840). Items 821–828 correspond to edges 721–728 in the bit time between epochs 0 and 1.

Figure 9:
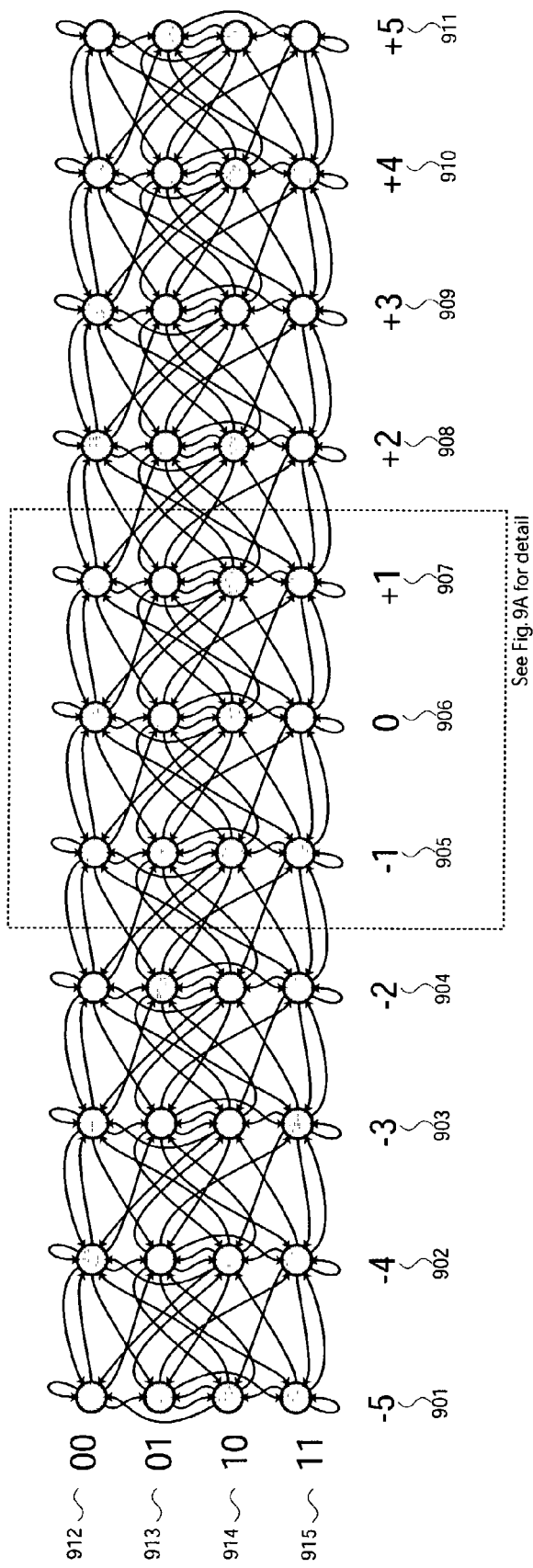
FIG. 9 is a composite state diagram representation of a class-IV partial response (PR4) channel with timing perturbations.

FIG. 9 shows a composite state diagram representation of a class-IV partial response (PR4) channel with timing perturbations. This composite state diagram consists of 44 states. Each composite state corresponds to a unique pairing of 11 integer timing perturbations (901–911) and 4 data states (912–915), each data state corresponding to a possible sequence of two previously recorded data bits. The composite states are arranged in a grid so that all states on the same row share the same value for the two previously recorded data bits and all states on the same column share the same value for the integer timing perturbation. The system shown in this state diagram thus represents the mathematical product of the system shown in FIG. 5 and the system shown in FIG. 7. Each state in FIG. 9 corresponds to a unique pair of one state from FIG. 5 and one state from FIG. 7. Each edge in FIG. 9 corresponds to a unique pair of one edge from FIG. 5 and one edge from FIG. 7.

Figure 9A:
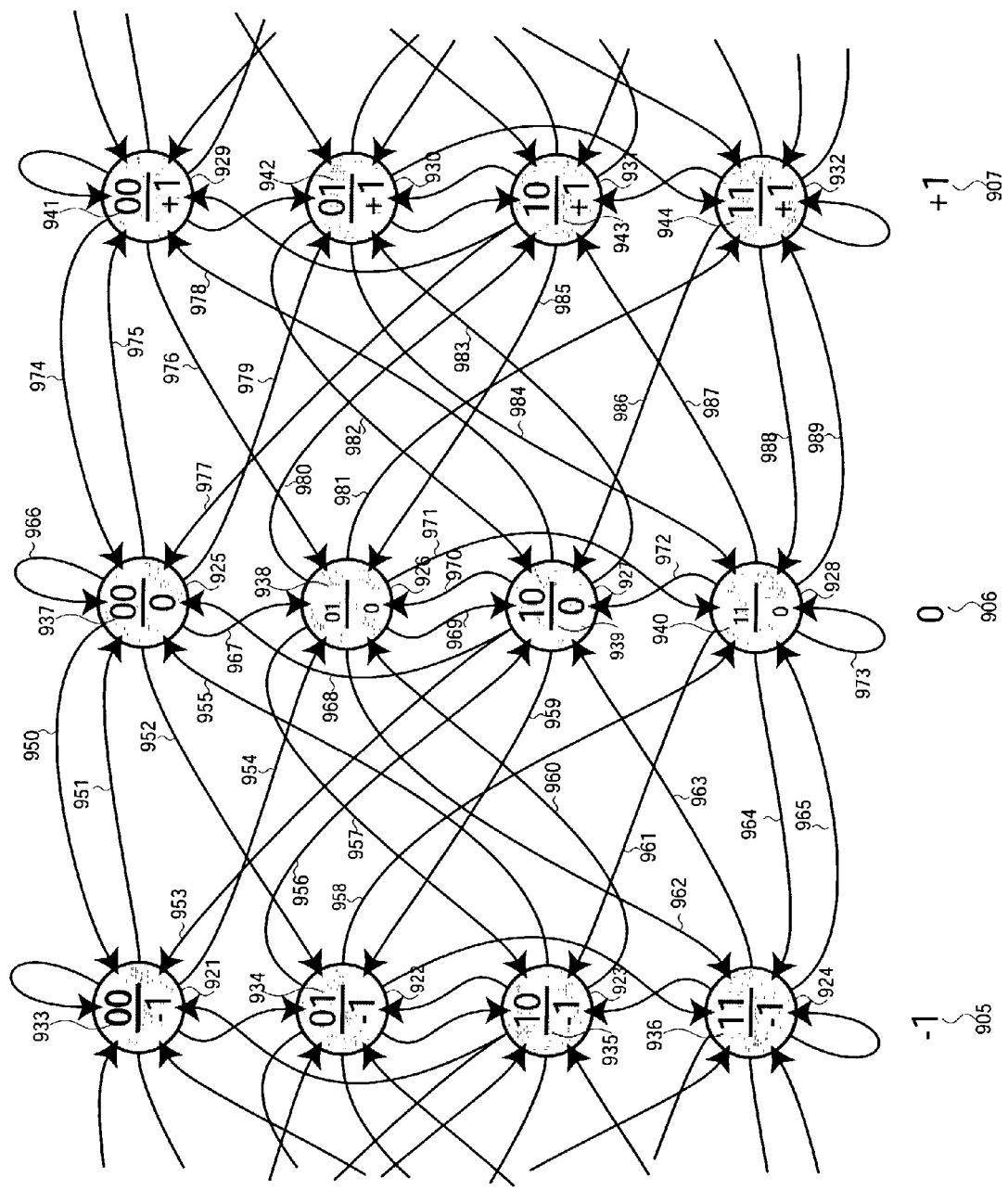

FIG. 9A shows, in detail, a portion of the state diagram of FIG. 9. Only the 12 composite states corresponding to timing perturbation values −1, 0 and +1 are shown. Each of these states (921–932) corresponds to a unique pair of data values and timing perturbation values (933–944). Edges (950–989) are used to indicate possible ways the system can evolve at each time epoch.

Figure 10:
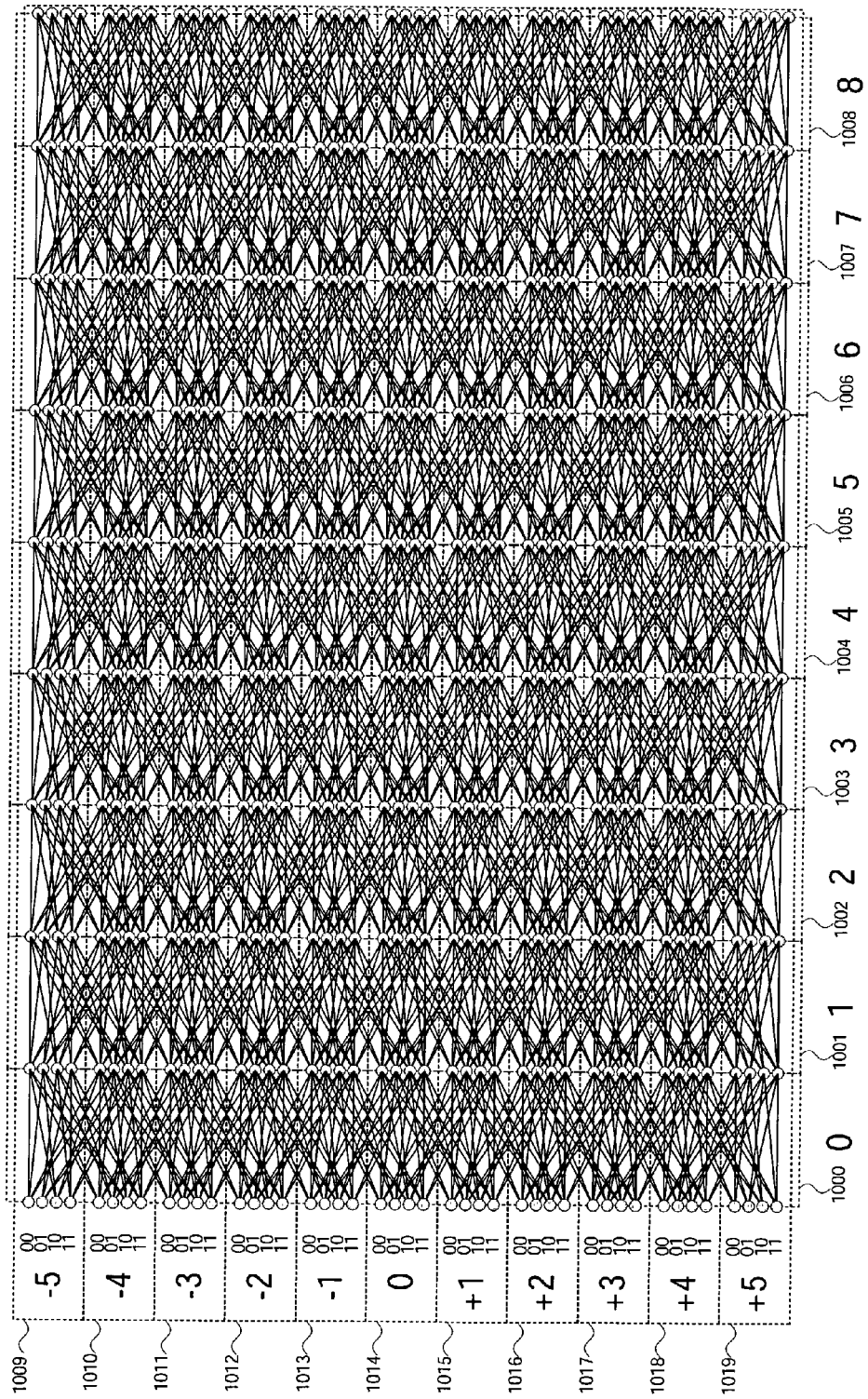
FIG. 10 is a trellis diagram representation of the same system represented in FIG. 9.

FIG. 10 shows a trellis diagram representation of a the same system represented in FIG. 9. As in FIGS. 6 and 8, the trellis diagram consists of 9 trellis sections 1000–1008 corresponding to bit times 0 through 8 between successive time epochs. The trellis diagram is drawn as a composite of 11 sub-trellises (1009–1019). Each sub-trellis is a PR4 trellis for a particular value of timing perturbation. Edges connect adjacent sub-trellises and represent changes in the timing perturbation.

Figure 10A:
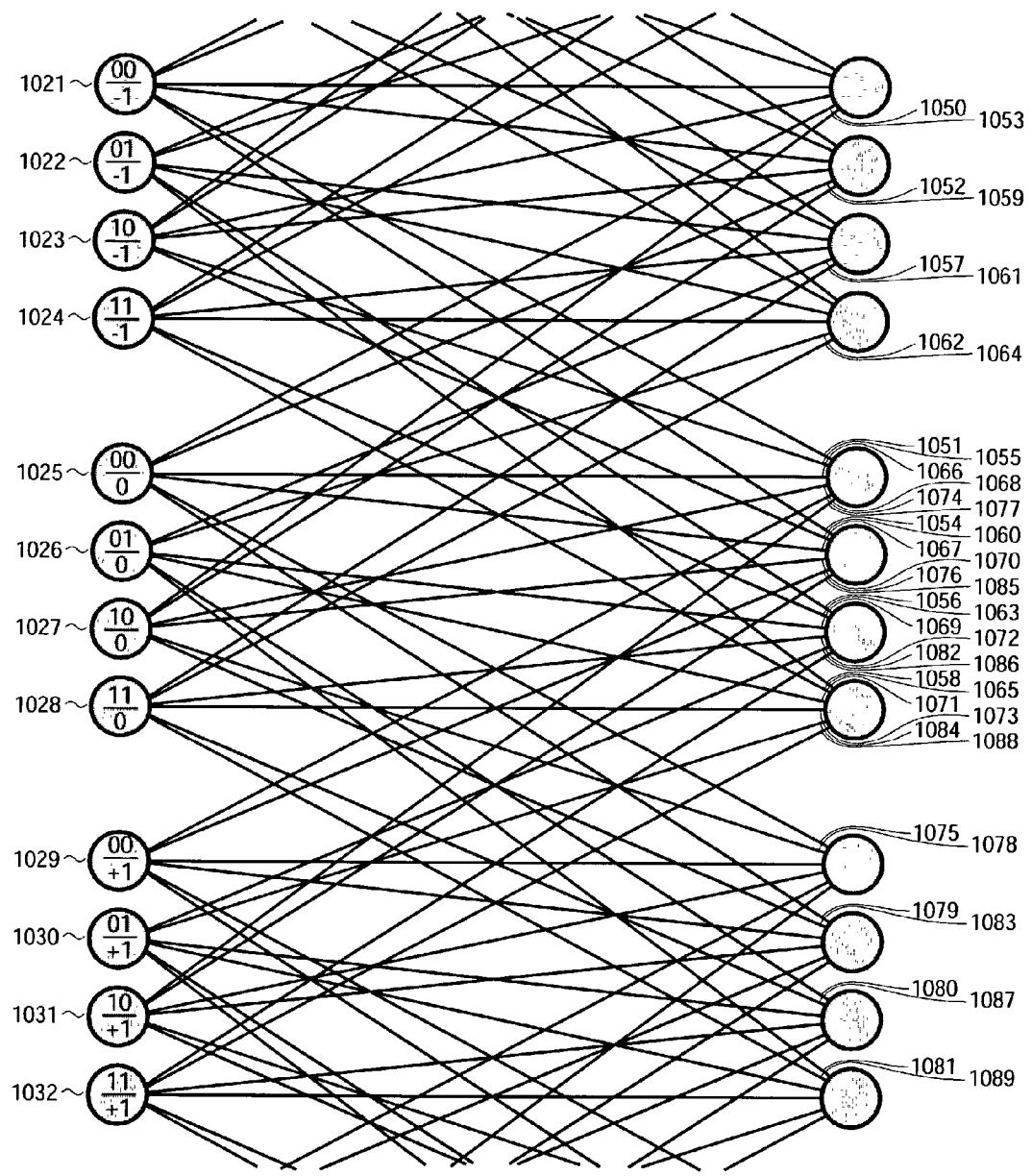
FIG. 10A is a detailed portion of the trellis diagram of FIG. 10.

FIG. 10A shows, in detail, a portion of the trellis diagram of FIG. 10. Only the 12 states corresponding to timing perturbation values −1, 0 and +1 are shown. Each of these states (1021–1032) corresponds to a composite state shown in FIG. 9A (921–932). Similarly, edges 1050–1089 correspond to a edges 950–989 in FIG. 9A.

Figure 11:
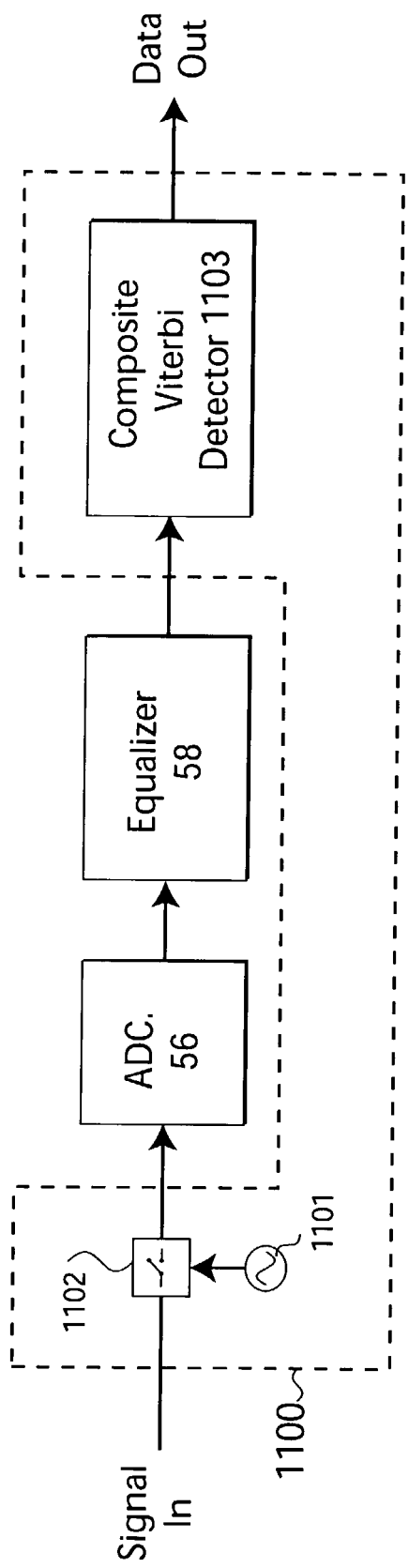
FIG. 11 is a block diagram of the data detection system of the present invention.

FIG. 11 shows a portion the data detection system 1100 of the present invention that may replace the prior art detector 62 and timing recovery system 60 (FIG. 3). Detection system 1100 includes a free-running sampling clock 1101, sampling device 1102 and composite Viterbi detector 1103 as previously described. Because the composite detector 1103 incorporates a model of timing perturbations a separate feedback circuit for timing recovery is not required to adjust the frequency and phase of sampling clock 1101.

Figure 12:
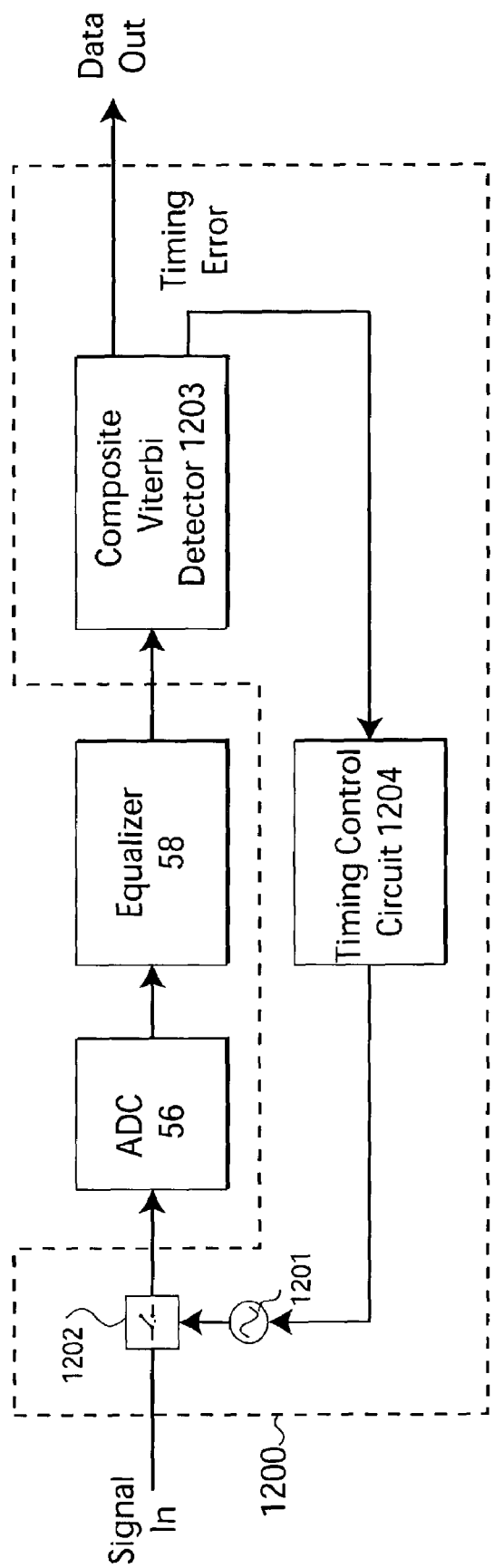
FIG. 12 is a block diagram of an alternative embodiment of the data detection system of the present invention that uses the timing error from the maximum-likelihood timing path to adjust the sampling clock.

FIG. 12 shows an alternative embodiment data detection system 1200 that includes a sampling clock 1201, sampling device 1202 and composite Viterbi detector 1203 as previously described. The composite detector 1203 decodes the most likely sequence or path of timing perturbations, which can be used as timing error information. This timing error information is processed by a timing control circuit 1204 and used to adjust the frequency and phase of the sampling clock 1201. If the composite detector indicates that the clock is sampling too early then the clock frequency would be reduced slightly. Conversely if the composite detector indicates that the clock is sampling too late then the clock frequency would be increased slightly. The objective of this timing loop is not to completely eliminate the timing error, rather it is to ensure that the maximum timing excursion remains within the range which can be accommodated by the composite detector 1203.

Figure 13:
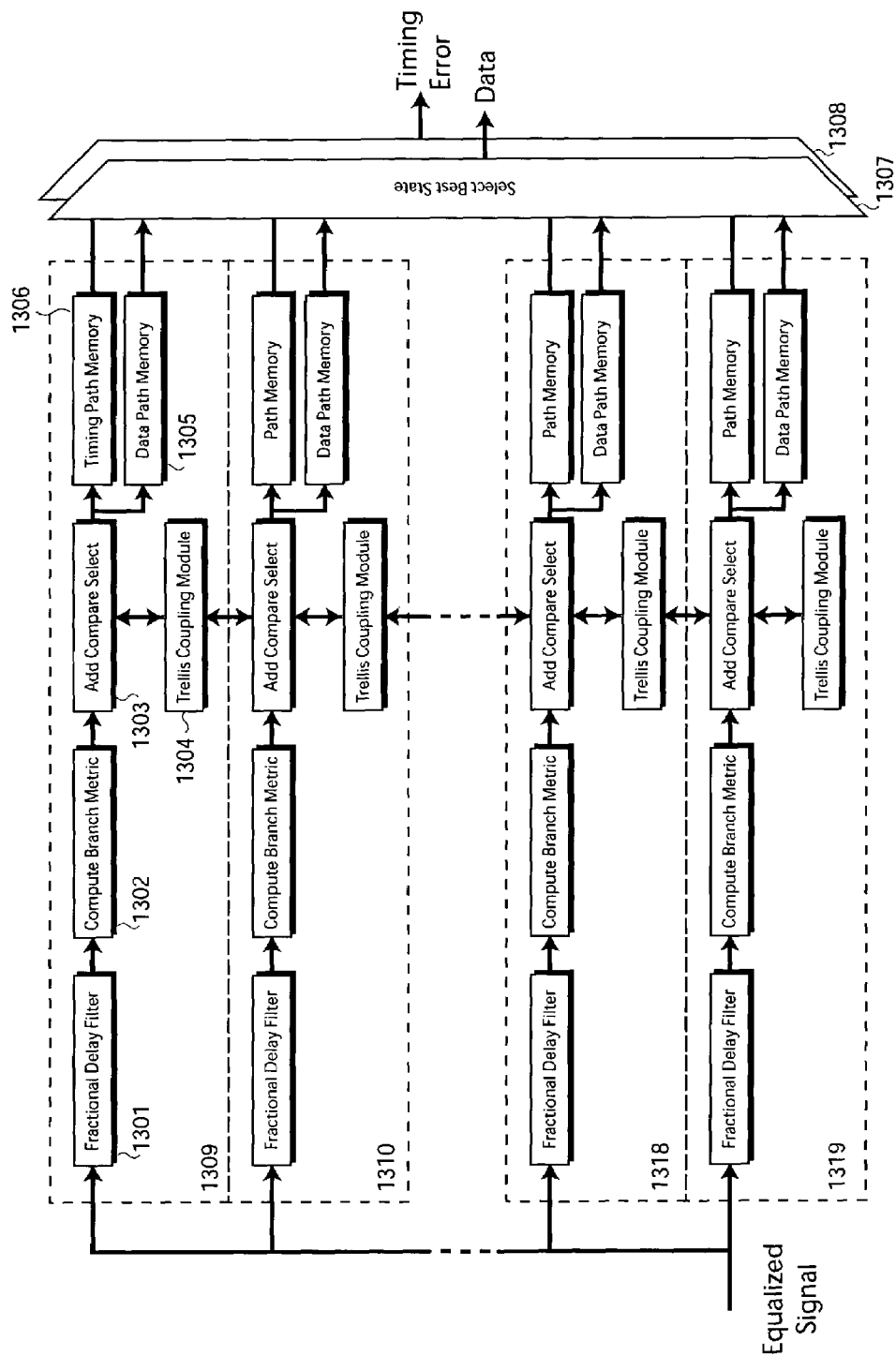
FIG. 13 is a schematic showing the elements making up the branch component detectors of the composite Viterbi detector according to the present invention.

FIG. 13 is a schematic showing in more detail the operation of the composite Viterbi detector according to the present invention. The composite states are naturally grouped into branch component detectors (1309–1319) each corresponding to component trellises (1009–1019) with the same value for timing perturbation. Each of these component trellises operates on values of the read-back signal sampled at the same instant in time. In the preferred embodiment the input to the composite detector is sampled at some arbitrary set of instants and a series of fractional delay filters, such as filter 1301 in branch 1309, interpolate the read-back signal samples to the correct sample instant for each component detector. Thus an important feature of the present invention is that each fractional delay filter compensates for the integer timing perturbation assigned to that branch. Each component detector incorporates features in common with conventional Viterbi detectors. These include a circuit to compute branch metrics 1302, perform the add-compare-select operations 1303 of the Viterbi algorithm, and a data path memory 1305. Some features which are not present in a conventional Viterbi detector include a trellis coupling module 1304 which performs add-compare-select operations on trellis branches representing transitions from one component trellis to another and a timing path memory 1306 to store the most likely timing perturbation values. The trellis coupling module 1304 incorporates additional add-compare-select circuits to accommodate branches between component detectors. The timing path memory 1306 is only present if the timing information is an explicit output of the composite detector. The timing path memory 1306 functions to store timing perturbation sequences associated with each surviving path through the trellis, in the same way that the data path memory 1305 stores the data sequences associated with each surviving path. At each epoch the timing perturbation value associated with each branch is appended to the timing perturbation sequence, stored in the path memory of the state in which the branch originates to produce an extended path memory associated with each branch. Each state stores the extended path memory of the branch with the best metric terminating in that state. A pair of multiplexers 1307, 1308 select the data and timing information from end of the path memory of the best composite state. The timing error from multiplexer 1308 can be fed back to timing control circuit 1204 to adjust the sampling clock 1201, as shown in the embodiment of FIG. 12.

In the present invention the probabilities of composite states in successive time epochs are computed, based upon the data samples, to jointly determine the most probable data values and timing perturbation values. The invention has been described above with respect to an embodiment in which the data detector that operates on the probabilities is a Viterbi detector that performs maximum-likelihood sequence detection. In actuality some of these data values may be in error, so that an error correcting code is usually used to find and correct any data errors.

However, the present invention is also operable with another type of detector that outputs probabilities on the data bits, rather than simply the most likely data bits. This type of detector is called an a posteriori probability detector, or colloquially a soft-output detector. Outputting probabilities gives more information for the error correction code to work with such that the data detection system as a whole performs better. The well-known Bahl-Cocke-Jelinek-Raviv (BCJR) algorithm, as described by L. R. Bahl et al., "Optimal Decoding of Linear Codes for Minimizing Symbol Error Rate", *IEEE Transactions on Information Theory*, March 1974, pp. 284–287, computes a posteriori probabilities. In addition, the well-known soft output Viterbi detection algorithm, or SOVA, as described by J. Hagenauer et al., "A Viterbi Algorithm with Soft-Decision Outputs and its Applications", *Proc. of GLOBECOM '89*, Dallas, Tex., USA, November 1989, pp. 47.1.1–47.1.7, also computes a posteriori probabilities and is simpler than the BCJR algorithm although it produces slightly inaccurate output.

The data channel according to the present invention has been described in detail with application to a magnetic recording disk drive digital data channel. However, the invention is fully applicable to data channels in other types of systems, including digital optical recording (such as DVD), digital tape recording (such as DLT), free-space optical data links, and ultra-wideband (UWB) wireless data links using baseband signaling.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A method for detecting data in a data channel, wherein the data signal is subject to inter-symbol interference and timing perturbations and is sampled periodically over a succession of time epochs without regard to said perturbations, the method comprising:

assigning integer timing perturbation values from −m to +m for each epoch;

assigning $A^n$ data states for each epoch, corresponding to n previous data samples each having A possible values;

pairing each timing perturbation value with each data state to arrive at $(2m+1)*(A^n)$ composite states, for each epoch; and assigning probabilities to the transitions between composite states in successive epochs, said probabilities depending upon samples of the data signal; whereby most probable data values are determined, said data values corresponding to a sequence of detected data values from the sampled data.

2. The method of claim 1 further comprising applying a Viterbi algorithm to the probabilities to determine maximum-likelihood path of successive composite states, said path corresponding to the sequence of detected data values.

3. The method of claim 1 wherein assigning probabilities comprises determining a posteriori probabilities of each data value.

4. The method of claim 3 wherein determining the a posteriori probabilities of each data value comprises applying the BCJR algorithm.

5. The method of claim 3 wherein determining the a posteriori probabilities of each data value comprises applying a soft-output Viterbi algorithm.

6. The method of claim 1 wherein A is 2 and the possible values for A are 0 and 1, and wherein the time between successive epochs is the bit time.

7. The method of claim 1 wherein n is 2 or 4.

8. The method of claim 1 wherein assigning probabilities between composite states in successive epochs comprises assuming the timing perturbation values follow a random walk.

9. The method of claim 1 wherein the data sampling is controlled by a sampling clock having an adjustable frequency and phase, and further comprising applying the timing perturbation values in the maximum likelihood path of composite states to the sampling clock to adjust its frequency and phase.

10. A method for detecting digital data in a disk drive data channel having a read head providing an analog signal, a sampling clock controlling the sampling of the analog signal at successive time epochs in the presence of timing perturbations, and an analog-to-digital converter (ADC) converting the sampled analog signal to digital data samples, wherein the digital data samples are subject to inter-symbol interference, the method comprising:

assigning integer timing perturbation values from −m to +m for each epoch while constraining said assigned timing perturbation value to increment or decrement by no more than 1 from the timing perturbation value assigned at a preceding epoch;

assigning $2^n$ data states for each epoch, corresponding to n previous digital data samples each having a possible value of 0 or 1;

pairing each timing perturbation value with each data state to arrive at $(2m+1)*(2^n)$ composite states, for each epoch; and applying a Viterbi algorithm to composite states in successive epochs to jointly determine the maximum likelihood path of timing perturbation values and the maximum likelihood digital data sequence.

11. The method of claim 10 wherein the analog signal sampling is controlled by a sampling clock having an adjustable frequency and phase, and further comprising applying the maximum likelihood path of timing perturbation values to the sampling clock to adjust its frequency and phase.

12. The method of claim 10 wherein n is 2, whereby the data states for each epoch consist of the sequences 00, 01, 10, 11.

13. The method of claim 10 wherein n is 4.

* * * * *